(12) United States Patent
Schulz

(10) Patent No.: US 6,920,799 B1
(45) Date of Patent: Jul. 26, 2005

(54) MAGNETIC FLOW METER WITH REFERENCE ELECTRODE

(75) Inventor: Robert K. Schulz, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 12 days.

(21) Appl. No.: 10/825,480

(22) Filed: Apr. 15, 2004

(51) Int. Cl.⁷ .............................................. G01F 1/37
(52) U.S. Cl. .................................. 73/861.52; 73/861.08
(58) Field of Search ........................ 73/861.52, 861.04, 73/861.08; 324/700

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,219,807 A * | 8/1980 | Speck et al. | 340/664 |
| 4,249,164 A | 2/1981 | Tivy | 340/870.3 |
| 4,250,490 A | 2/1981 | Dahlke | 340/870.37 |
| 4,279,013 A | 7/1981 | Cameron et al. | 340/870.37 |
| 4,337,516 A | 6/1982 | Murphy et al. | 364/551 |
| 4,399,824 A | 8/1983 | Davidson | 128/736 |

(Continued)

FOREIGN PATENT DOCUMENTS

| | | |
|---|---|---|
| CA | 999950 | 11/1976 |
| CA | 1300924 | 5/1992 |
| DE | 32 13 866 A1 | 10/1983 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |

(Continued)

OTHER PUBLICATIONS

U.S. Appl. No. 09/257,896, filed Feb. 25, 1999, Eryurek et al.
U.S. Appl. No. 09/409,098, filed Sep. 30, 1999, Eryurek et al.

(Continued)

*Primary Examiner*—Edward Lefkowitz
*Assistant Examiner*—Corey D. Mack
(74) *Attorney, Agent, or Firm*—Westman, Champlin & Kelly, P.A.

(57) ABSTRACT

An magnetic flow meter is provided which includes a reference electrode configured to electrically couple process fluid flowing within a flowtube of the flow meter. The reference electrode is adapted to measure potential of the process fluid. A current limiter is configured to limit current flow through the reference electrode and thereby reduce corrosion of the reference electrode.

19 Claims, 4 Drawing Sheets

U.S. PATENT DOCUMENTS

| | | | |
|---|---|---|---|
| 4,417,312 A | 11/1983 | Cronin et al. | 364/510 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,540,468 A | 9/1985 | Genco et al. | 162/49 |
| 4,545,258 A | 10/1985 | Coursolle | 73/861.22 |
| 4,571,689 A | 2/1986 | Hildebrand et al. | 364/481 |
| 4,575,678 A * | 3/1986 | Hladky | 205/776 |
| 4,592,240 A * | 6/1986 | McHale et al. | 73/861.22 |
| 4,598,251 A | 7/1986 | Wehrs | 328/140 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,741,215 A * | 5/1988 | Bohn et al. | 73/861.12 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,128,625 A | 7/1992 | Yatsuzuka et al. | 327/557 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 367/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,337,367 A | 8/1994 | Maeda | 381/94 |
| 5,339,335 A | 8/1994 | Molnar | 702/193 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/574 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,416,593 A | 5/1995 | Vercruysse | 356/429 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,087 A | 11/1995 | Eatwell | 327/555 |
| 5,469,156 A | 11/1995 | Kogure | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,779 A | 4/1996 | Maltby et al. | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,576,497 A | 11/1996 | Vignos et al. | 73/861.22 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |

| | | | | | | |
|---|---|---|---|---|---|---|
| 5,600,148 A | 2/1997 | Cole et al. ............... 250/495.1 | | 6,072,150 A | 6/2000 | Sheffer .................. 219/121.83 |
| 5,608,650 A | 3/1997 | McClendon et al. ........ 364/510 | | 6,094,600 A | 7/2000 | Sharpe, Jr. et al. ........... 700/19 |
| 5,623,605 A | 4/1997 | Keshav et al. ......... 395/200.17 | | 6,112,131 A | 8/2000 | Ghorashi et al. ........... 700/142 |
| 5,629,870 A | 5/1997 | Farag et al. ........... 364/551.01 | | 6,119,047 A | 9/2000 | Eryurek et al. ............... 700/28 |
| 5,633,809 A | 5/1997 | Wissenbach et al. ....... 364/510 | | 6,119,529 A | 9/2000 | Di Marco et al. ....... 73/861.68 |
| 5,637,802 A | 6/1997 | Frick et al. ................... 73/724 | | 6,139,180 A | 10/2000 | Usher et al. ..................... 374/1 |
| 5,640,491 A | 6/1997 | Bhat et al. ..................... 395/22 | | 6,151,560 A | 11/2000 | Jones .......................... 702/58 |
| 5,644,240 A | 7/1997 | Brugger ...................... 324/439 | | 6,179,964 B1 | 1/2001 | Begemann et al. ......... 162/198 |
| 5,654,869 A | 8/1997 | Ohi et al. .................... 361/540 | | 6,182,501 B1 | 2/2001 | Furuse et al. ................ 73/49.2 |
| 5,661,668 A | 8/1997 | Yemini et al. .............. 364/550 | | 6,192,281 B1 | 2/2001 | Brown et al. ................... 700/2 |
| 5,665,899 A | 9/1997 | Willcox ...................... 73/1.63 | | 6,195,591 B1 | 2/2001 | Nixon et al. .................... 700/2 |
| 5,669,713 A | 9/1997 | Schwartz et al. ............... 374/1 | | 6,199,018 B1 | 3/2001 | Quist et al. .................... 702/34 |
| 5,671,335 A | 9/1997 | Davis et al. ................... 395/23 | | 6,209,048 B1 | 3/2001 | Wolff ........................... 710/62 |
| 5,672,247 A | 9/1997 | Pangalos et al. .............. 162/65 | | 6,236,948 B1 | 5/2001 | Eck et al. ...................... 702/45 |
| 5,675,504 A | 10/1997 | Serodes et al. .............. 364/496 | | 6,237,424 B1 | 5/2001 | Salmasi et al. ........... 73/861.17 |
| 5,675,724 A | 10/1997 | Beal et al. ............... 395/182.02 | | 6,261,439 B1 * | 7/2001 | Schwabe et al. ............. 205/725 |
| 5,680,109 A | 10/1997 | Lowe et al. ................. 340/608 | | 6,263,487 B1 | 7/2001 | Stripf et al. .................... 717/1 |
| 5,682,317 A | 10/1997 | Keeler et al. ........... 364/431.03 | | 6,272,438 B1 | 8/2001 | Cunningham et al. ........ 702/56 |
| 5,700,090 A | 12/1997 | Eryurek ...................... 374/210 | | 6,298,377 B1 | 10/2001 | Hartikainen et al. ......... 709/223 |
| 5,703,575 A | 12/1997 | Kirkpatrick ............ 340/870.17 | | 6,307,483 B1 | 10/2001 | Westfield et al. ....... 340/870.11 |
| 5,704,011 A | 12/1997 | Hansen et al. ................. 395/22 | | 6,311,136 B1 | 10/2001 | Henry et al. .................. 702/45 |
| 5,705,978 A | 1/1998 | Frick et al. ................. 340/511 | | 6,317,701 B1 | 11/2001 | Pyotsia et al. ............... 702/188 |
| 5,708,211 A | 1/1998 | Jepson et al. ............ 73/861.04 | | 6,327,914 B1 | 12/2001 | Dutton .................. 73/861.356 |
| 5,708,585 A | 1/1998 | Kushion .............. 364/431.061 | | 6,347,252 B1 | 2/2002 | Behr et al. ...................... 700/2 |
| 5,710,370 A | 1/1998 | Shanahan et al. ............. 73/1.35 | | 6,356,191 B1 | 3/2002 | Kirkpatrick et al. ......... 340/501 |
| 5,710,708 A | 1/1998 | Wiegland ................. 364/470.1 | | 6,360,277 B1 | 3/2002 | Ruckley et al. ................. 9/250 |
| 5,713,668 A | 2/1998 | Lunghofer et al. .......... 374/179 | | 6,370,448 B1 | 4/2002 | Eryurek et al. .............. 700/282 |
| 5,719,378 A | 2/1998 | Jackson, Jr. et al. ........ 219/497 | | 6,377,859 B1 | 4/2002 | Brown et al. .................. 700/79 |
| 5,736,649 A | 4/1998 | Kawasaki et al. ....... 73/861.23 | | 6,397,114 B1 | 5/2002 | Eryurek et al. ............... 700/51 |
| 5,741,074 A | 4/1998 | Wang et al. ................. 374/185 | | 6,405,099 B1 | 6/2002 | Nagai et al. ................. 700/159 |
| 5,742,845 A | 4/1998 | Wagner ...................... 395/831 | | 6,425,038 B1 | 7/2002 | Sprecher ..................... 710/269 |
| 5,746,511 A | 5/1998 | Eryurek et al. ................. 374/2 | | 6,434,504 B1 | 8/2002 | Eryurek et al. ............. 702/130 |
| 5,747,701 A | 5/1998 | Marsh et al. ............ 73/861.23 | | 6,449,574 B1 | 9/2002 | Eryurek et al. ............... 702/99 |
| 5,752,008 A | 5/1998 | Bowling ...................... 395/500 | | 6,473,656 B1 | 10/2002 | Langels et al. ............... 700/17 |
| 5,764,539 A | 6/1998 | Rani ........................... 364/557 | | 6,473,710 B1 | 10/2002 | Eryurek ...................... 702/133 |
| 5,764,891 A | 6/1998 | Warrior ................... 395/200.2 | | 6,480,793 B1 | 11/2002 | Martin ......................... 702/45 |
| 5,781,878 A | 7/1998 | Mizoguchi et al. ......... 701/109 | | 6,501,266 B1 * | 12/2002 | Krivoi et al. ................ 324/238 |
| 5,790,413 A | 8/1998 | Bartusiak et al. ........... 364/485 | | 6,505,517 B1 | 1/2003 | Eryurek et al. .......... 73/861.08 |
| 5,801,689 A | 9/1998 | Huntsman ................... 345/329 | | 6,519,546 B1 | 2/2003 | Eryurek et al. ............. 702/130 |
| 5,805,442 A | 9/1998 | Crater et al. ................ 364/138 | | 6,532,392 B1 | 3/2003 | Eryurek et al. ............... 700/54 |
| 5,817,950 A | 10/1998 | Wiklund et al. .......... 73/861.66 | | 6,539,267 B1 | 3/2003 | Eryurek et al. ............... 700/51 |
| 5,825,664 A | 10/1998 | Warrior et al. .................. 700/7 | | 6,556,145 B1 | 4/2003 | Kirkpatrick et al. ... 340/870.17 |
| 5,828,567 A | 10/1998 | Eryurek et al. ............... 700/79 | | 6,594,603 B1 | 7/2003 | Eryurek et al. ............. 702/104 |
| 5,829,876 A | 11/1998 | Schwartz et al. ............... 374/1 | | 6,601,005 B1 | 7/2003 | Eryurek et al. ............. 702/104 |
| 5,848,383 A | 12/1998 | Yunus ......................... 702/102 | | 6,611,775 B1 | 8/2003 | Coursolle et al. ............. 702/65 |
| 5,859,964 A | 1/1999 | Wang et al. ............ 395/185.01 | | 6,615,149 B1 | 9/2003 | Wehrs .......................... 702/76 |
| 5,867,058 A | 2/1999 | DeCarlo, Jr. ................ 327/557 | | 6,617,855 B2 * | 9/2003 | Flatt et al. ................... 324/326 |
| 5,876,122 A | 3/1999 | Eryurek ...................... 374/183 | | 6,654,697 B1 | 11/2003 | Eryurek et al. ............... 702/47 |
| 5,880,376 A | 3/1999 | Sai et al. ................... 73/861.08 | | 6,701,274 B1 | 3/2004 | Eryurek et al. ............. 702/140 |
| 5,887,978 A | 3/1999 | Lunghofer et al. .......... 374/179 | | 2002/0013629 A1 | 1/2002 | Nixon et al. |
| 5,908,990 A | 6/1999 | Cummings .............. 73/861.22 | | 2002/0145568 A1 | 10/2002 | Winter ........................ 343/701 |
| 5,909,188 A | 6/1999 | Tetzlaff et al. .............. 341/155 | | 2003/0033040 A1 | 2/2003 | Billings ...................... 700/97 |
| 5,923,557 A | 7/1999 | Eidson ................... 364/471.03 | | 2003/0045962 A1 | 3/2003 | Eryurek et al. |
| 5,924,086 A | 7/1999 | Mathur et al. ................ 706/25 | | | | |
| 5,926,778 A | 7/1999 | Pöppel ........................ 702/130 | | FOREIGN PATENT DOCUMENTS | | |
| 5,936,514 A | 8/1999 | Anderson et al. ...... 340/310.01 | DE | 299 17 651 U1 | 12/2000 | |
| 5,940,290 A | 8/1999 | Dixon ......................... 364/138 | DE | 100 36 971 A1 | 2/2002 | |
| 5,956,663 A | 9/1999 | Eryurek et al. ............. 702/183 | EP | 0 122 622 A1 | 10/1984 | |
| 5,970,430 A | 10/1999 | Burns et al. ................ 702/122 | EP | 0 413 814 A1 | 2/1991 | |
| 6,014,902 A | 1/2000 | Lewis et al. ............. 73/861.12 | EP | 0 487 419 A2 | 5/1992 | |
| 6,016,523 A | 1/2000 | Zimmerman et al. ......... 710/63 | EP | 0 512 794 A2 | 11/1992 | |
| 6,016,706 A | 1/2000 | Yamamoto et al. ................ 9/6 | EP | 0 594 227 A1 | 4/1994 | |
| 6,017,143 A | 1/2000 | Eryurek et al. ............... 700/51 | EP | 0 624 847 A1 | 11/1994 | |
| 6,023,399 A | 2/2000 | Kogure ........................ 361/23 | EP | 0 644 470 A2 | 3/1995 | |
| 6,026,352 A | 2/2000 | Burns et al. ................ 702/182 | EP | 0 825 506 A2 | 7/1997 | |
| 6,038,579 A | 3/2000 | Sekine ........................ 708/400 | EP | 0 827 096 A2 | 9/1997 | |
| 6,045,260 A | 4/2000 | Schwartz et al. ............ 374/183 | EP | 0 838 768 A2 | 9/1997 | |
| 6,047,220 A | 4/2000 | Eryurek et al. ............... 700/28 | EP | 0 807 804 A2 | 11/1997 | |
| 6,047,222 A | 4/2000 | Burns et al. ................... 700/79 | EP | 1 058 093 A1 | 5/1999 | |
| 6,052,655 A | 4/2000 | Kobayashi et al. .......... 702/184 | EP | 1 022 626 A2 | 7/2000 | |
| 6,061,603 A | 5/2000 | Papadopoulos et al. ....... 700/83 | FR | 2 302 514 | 9/1976 | |

| | | |
|---|---|---|
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 342 453 A | 4/2000 |
| GB | 2 347 232 A | 8/2000 |
| JP | 58-129316 | 8/1983 |
| JP | 59-116811 | 7/1984 |
| JP | 59-163520 | 9/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 64-01914 | 1/1989 |
| JP | 64-72699 | 3/1989 |
| JP | 2-05105 | 1/1990 |
| JP | 3-229124 | 10/1991 |
| JP | 5-122768 | 5/1993 |
| JP | 05203761 | 8/1993 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 08-114638 | 5/1996 |
| JP | 8-136386 | 5/1996 |
| JP | 8-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/37391 | 8/1998 |
| WO | WO 98/39718 | 9/1998 |
| WO | WO 99/19782 | 4/1999 |
| WO | WO 00/41050 | 7/2000 |
| WO | WO 00/55700 | 9/2000 |
| WO | WO 00/70531 | 11/2000 |
| WO | WO 01/01213 A1 | 1/2001 |
| WO | WO 01/77766 | 10/2001 |
| WO | WO 01/90704 A2 | 11/2001 |
| WO | WO 02/27418 | 4/2002 |

OTHER PUBLICATIONS

U.S. Appl. No. 09/799,824, filed Mar. 5, 2001, Rome et al.
U.S. Appl. No. 09/855,179, filed May 14, 2001, Eryurek et al.
U.S. Appl. No. 09/852,102, filed May 9, 2001, Eryurek et al.
U.S. Appl. No. 09/972,078, filed Oct. 5, 2001, Eryurek et al.
U.S. Appl. No. 10/635,944 filed Aug. 7,2003, Huisenga et al.
"A TCP\IP Tutorial" by, Socolofsky et al., Spider Systems Limited, Jan. 1991 pp. 1–23.

"Approval Standards For Explosionproof Electrical Equipment General Requirements", Factory Mutual Research, Cl. No. 3615, Mar. 1989, pp. 1–34.
"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1–70.
"Automation On–line" by, Phillips et al., Plant Services, Jul. 1997, pp. 41–45.
"Climb to New Heights by Controlling your PLCs Over the Internet" by, Phillips et al., Intech, Aug. 1998, pp. 50–51.
"CompProcessor For Piezoresistive Sensors" MCA Technologies Inc. (MCA7707), pp. 1–8.
"Ethernet emerges as viable, inexpensive fieldbus", Paul G. Schreier, Personal Engineering, Dec. 1997, p. 23–29.
"Ethernet Rules Closed–loop System" by, Eidson et al., Intech, Jun. 1998, pp. 39–42.
"Fieldbus Standard for Use in Industrial Control Systems Part 2: Physical Layer Specification and Service Definition", ISA–S50.02–1992, pp. 1–93.
"Fieldbus Standard for Use in Industrial Control Systems Part 3: Data Link Service Definition", ISA–S50.02–1997, Part 3, Aug. 1997, pp. 1–159.
Fieldbus Standard For Use in Industrial Control Systems Part 4: Data Link Protocol Specification, ISA–S50.02–1997, Part. 4, Aug. 1997, pp. 1–148.
"Fieldbus Support For Process Analysis" by, Blevins et al., Fisher–Rosemount Systems, Inc., 1995, pp. 121–128.
"Fieldbus Technical Overview Understanding FOUNDATION™ fieldbus technology", Fisher–Rosemount, 1998, pp. 1–23.
"Hypertext Transfer Protocol—HTTP/1.0" by, Berners–Lee et al., MIT/LCS, May 1996, pp. 1–54.
"Infranets, Intranets, and the Internet" by, Pradip Madan, Echelon Corp, Sensors, Mar. 1997, pp. 46–50.
"Internet Technology Adoption into Automation" by, Fondl et al., Automation Business, pp. 1–5.
"Internet Protocol Darpa Internet Program Protocol Specification" by, Information Sciences Institute, University of Southern California, RFC 791, Sep. 1981, pp. 1–43.
"Introduction to Emit", emWare, Inc., 1997, pp. 1–22.
"Introduction to the Internet Protocols" by, Charles L. Hedrick, Computer Science Facilities Group, Rutgers University, Oct. 3, 1988, pp. 1–97.
"Is There A Future For Ethernet in Industrial Control?", Miclot et al., Plant Engineering, Oct. 1988, pp. 44–46, 48, 50.
LFM/SIMA Internet Remote Diagnostics Research Project Summary Report, Stanford University, Jan. 23, 1997, pp. 1–6.
"Managing Devices with the Web" by Howard et al., Byte, Sep. 1997, pp. 45–64.
"Modular Microkernel Links GUI And Browser For Embedded Web Devices" by, Tom Williams, pp. 1–2.
"PC Software Gets Its Edge From Windows, Components, and the Internet", Wayne Labs, I&CS, Mar. 1997, pp. 23–32.
Proceedings Sensor Expo, Aneheim, California, Produced by Expocon Managemnet Associates, Inc., Apr. 1996, pp. 9–21.
Proceedings Sensor Expo, Boston, Massachuttes, Produced by Expocon Management Associates, Inc., May 1997, pp. 1–416.
"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–69.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–of–Control Events in Manufacturing Processes," by P. Love et al., *IEEE*, 1989, pp. 736–741.

"Advanced Engine Diagnostics Using Universal Process Modeling", by P. O'Sullivan, *Presented at the 1996 SAE Conference on Future Transportation Technology*, pp. 1–9.

Parallel, Fault–Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1139–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1–4.

"Application of Neural Computing Paradigms for Signal Validation," by B.R. Upadhyaya et al., *Department of Nuclear Engineering*, pp. 1–18.

"Application of Neural Networks for Sensor Validation and Plant Monitoring," by B. Upadhyaya et al., *Nuclear Technology*, vol. 97, No. 2, Feb. 1992 pp. 170–176.

"Automated Generation of Nonlinear System Characterization for Sensor Failure Detection," by B.R. Upadhyaya et al., *ISA*, 1989 pp. 269–274.

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600° C.", by M.J. de Groot et al., *Cal Lab*, Jul./Aug. 1996, pp. 38–41.

"Survey, Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249–1259.

"Field–based Architecture is Based on Open Systems, Improves Plant Performance", by P. Cleaveland, *I&CS*, Aug. 1996, pp. 73–74.

"Tuned–Circuit Dual–Mode Johnson Noise Thermometers," by R.L. Shepard et al., Apr. 1992.

"Tuned–Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Development of a Long–Life, High–Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29–Aug. 1, 1996, pp. 50–1–50–6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Development and Application of Neural Network Algorithms For Process Diagnostics," by B.R. Upadhyaya et al., *Proceedings of the 29th Conference on Decision and Control*, 1990, pp. 3277–3282.

"A Fault–Tolerant Interface for Self–Validating Sensors", by M.P. Henry, *Colloquium*, pp. 3/1–3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68–88.

"Keynote Paper: Hardware Compilation–A New Technique for Rapid Prototyping of Digital Systems–Applied to Sensor Validation", by M.P. Henry, *Control Eng. Practice*, vol. 3, No. 7., pp. 907–924, (1995).

"The Implications of Digital Communications on Sensor Validation", by M. Henry et al., *Report No. QUEL 1912/92*, (1992).

"In–Sit Response Time Testing of Thermocouples", *ISA*, by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control*, Aug. 24–26, 1988, pp. 1–6.

"Integration of Mulitple Signal Validation Modules for Sensor Monitoring," by B. Upadhyaya et al., *Department of Nuclear Engineering*, Jul. 8, 1990, pp. 1–6.

"Intelligent Behaviour for Self–Validating Sensors", by M.P. Henry, *Advances In Measurement*, pp. 1–7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"Neural Networks for Sensor Validation and Plant Monitoring," by B. Upadhyaya, *International Fast Reactor Safety Meeting*, Aug. 12–16, 1990, pp. 2–10.

"Neural Networks for Sensor Validation and Plantwide Monitoring," by E. Eryurek, 1992.

"A New Method for Johnson Noise Thermometry", by C.J. Borkowski et al., *Rev. Sci. Instrum.*, vol. 45, No. 2, (Feb. 1974) pp. 151–162.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–253 (Mar. 1997).

*Instrument Engineers' Handbook*, Chapter IV entitled "Temperature Measurements," by T.J. Claggett, pp. 266–333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," $6^{Th}$ . WWW Conference Workshop on Embedded Web Technology, Santa Clara, CA (Apr. 7, 1997).

Microsoft Press Computer Dictionary, $3^{rd}$ Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.–Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED–vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques*, NCA–vol. 10, pp. 31–36 (1991).

"Developing Predictive Models for Cavitation Erosion," *Codes and Standards in A Global Environment*, PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

"A Microcomputer–Based Instrument for Applications in Platinum Resistance Thermomety," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier, Sensor and Acuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo," by Barabino et al., Automazione e Strumentszione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (Oct. 1992).

"Ziele und Anwendungen von Feldbussystemen," by T. Pfeifer et al., pp. 549–557 (Oct. 1987).

"PROFIBUS Infrastructure Measures," by Tilo Pfeifer et al., pp. 416–419 (Aug. 1991).

"Simulation the Time Behaviour of Fieldbus Systems," by Schnelle, pp. 440–442 (1991).

"Modélisation et simulation d'un bus de terrain: FIP," by Song et al, pp. 5–9 (undated).

"Field Bus Networks for Automation Systems Containing Intelligent Functional Unites," by W. Kriesel et al., pp. 486–489 (1987).

"Field Buses for Process Interconnection with Digital Control Systems," Tecnologia, pp. 141–147 (1990).

"Decentralised Systems with Real–Time Field Bus," Netzwerke, Jg. Nr.3 v. 14.3, 4 pages (1990).

"Process Measurement and Analysis," by Liptak et al., Instrument Engineers' Handbook, Third Edition, pp. 528–530, (1995).

"Improving Dynamic Performance of Temperature Sensors With Fuzzy Control Techniques," by Wang Lei et al., pp. 872–873 (1992).

"Microsoft Press Computer Dictionary" 2nd Edition, 1994, Microsoft Press. p. 156.

International Search Report from Application No. PCT/US01/40791 with international filing date of May 22, 2001.

International Search Report from Application No. PCT/US01/40782 with international filing date of May 22, 2001.

International Search Report from Application No. PCT/02/14560 with international filing date of May 8, 2002.

International Search Report from Application No. PCT/US02/14934 with international filing date of May 8, 2002.

"On–Line Tool Condition Monitoring System With Wavelet Fuzzy Neural Network," by Li Xiaoli et al., pp. 271–276 (1997).

"Optimal Design of the Coils of An Electromagnetic Flow Meter," by Michalski, A. et al., IEEE Transactions on Magnetics, vol. 34, Issue 5, Part 1, pp. 2563–2566 (1998).

"Magnetic Fluid Flow Meter for Gases," Popa, N.C., IEEE Transactions on Magnetics, vol. 30, Issue 2, Part 1–2, pp. 936–938 (1993).

"New Approach to A Main Error Estimation for Primary Transducer of Electromagnetic Flow Meter," by Michalski, A., IEEE Instrumentation and Measurement Technology Conference Proceedings, vol. 2, pp. 1093–1097 (1998).

"Additional Information From Flowmeters Via Signal Analysis," by Amadi–Echendu, J.E. et al., IEEE Instrumentation and Measurement Technology Conference Record, vol. 7, pp. 187–193 (1990).

International Search Report from Application No. PCT/US02/06606 with international filing date of Mar. 5, 2002.

International Search Report from Application No. PCT/US02/30465 with international filing date of Sep. 25, 2002.

"What is a weighted moving average?", *DAU Stat Refresher*, http://cne.gmu.edu/modules/dau/stat/mvavgs/wma_bdy.html. (1995).

U.S. Appl. No. 10/675,014, filed Sep. 2003, Longsdorf et al.

U.S. Appl. No. 10/744,809, filed Dec. 2003, Brown et al.

"Statistics Glossary: Time Series Data", by Easton et al., http://www.stats.gla.ac.uk/steps/glossary/time_series.html, Sep. 1997.

"The Indicators Story", Sustainable Seattle, pp. 55–59, 1998.

"Detecting Regimes in Temperature Time Series", by Clemins et al., *Artificial Neural Networks in Engineering, Proceedings*, pp. 727–732, 2001.

"Re: Digital Filter–Moving Average", The Math Forumn, http://mathforum.org/discuss/sci.math/a/t/177212, Sep. 28, 1998.

U.S. Appl. No. 10/893,144, filed Jul. 2004, Brown et al.

"Notification of Transmittal of the International Search Report and the Written Opinion of the International Searching Authority", or the Declaration for PCT/US2004/017300.

* cited by examiner

MAGNETIC FLOW METER WITH REFERENCE ELECTRODE

FIELD OF THE INVENTION

The present invention is related to the process measurement and control industry. More specifically, the present invention is related to magnetic flow meters.

BACKGROUND OF THE INVENTION

Magnetic flow meters are used to measure flow of a conductive process fluid through a flowtube. The conductive fluid flows past an electromagnet and electrodes. In accordance with Faraday's law of electromagnetic induction, an electromotive force (EMF) is induced in the fluid due to an applied magnetic field. The EMF is proportional to the flow rate of the fluid. The electrodes are positioned in the flowtube to make electrical contact with the flowing fluid. The electrodes sense the EMF that is magnetically induced in the fluid which can then be used to determine flow rate. The EMF is measured by the flow meter using a differential front end amplifier connected across the electrodes. The potential of the process fluid is used as a reference for the differential amplifier. Note that this reference may not necessarily be Earth ground.

The transmitter must be referenced to the process to provide a stable reading. This process connection is established by insuring electrical connection between the flowtube and the process. This can be done with ground rings which strap to flowtube, a ground electrode which is connected directly to the flowtube, or a strap between the flowtube and the adjacent conductive pipe. Earth ground can provide a low noise reference and often is required by electrical safety code. However, earth ground is not necessarily required for proper operation. Some installations due to the electrical nature of the process or the corrosiveness of the process fluid use either plastic or non-conductive pipe or a lining in the metal pipe. In these cases, the process may be at a different electrical potential than earth ground. The connection between the ground electrode and flowtube through bolts or some other means can provide a path for electrical current to ground which may lead to corrosion of the ground ring or ground electrode.

In many process installations, process piping carrying the process fluid is conductive and is in contact with the process fluid. Accordingly, simply connecting a strap from the flowtube to the process piping will ensure that the conductive fluid is at the same potential as the flowtube. However, in some applications, the process piping itself may be non-conductive, or may have a non-conductive inner lining. Thus, electrical contact to the process piping itself will not establish a reference to the process fluid. In these situations, an alternative technique must be used to electrically couple to the process fluid. For example, a process reference can be accomplished by using either ground rings or a ground electrode within or adjacent to the flow meter.

One of the problems that has occurred in magnetic flow meters in accordance with the prior art is significant corrosion of ground electrodes. The connection between the ground electrode and flowtube through bolts or some other means can provide a path for electrical connection to ground which may lead to corrosion of the ground ring or ground electrode. In installations where ground electrodes tend to corrode, the flowtube can be electrically isolated from earth ground to remove the electrical path to ground. This will generally prevent any electrical current from flowing through the process fluid and the ground electrode to earth ground. While this approach has generally resolved many problems, it has not addressed all situations.

Some situations continue to exist where it is not feasible to isolate the flowtube from ground due to the particular application. One example of such a case is where the bolts themselves used to install the flowtube provide an electrical path between the flowtube and the adjacent process piping. Another example is the use of metal lined pipe which prevents isolation of the flowtube from adjacent piping. However, this will likely provide some path to earth resulting in stray current corrosion of the ground electrode or ground ring. In such environments, grounding rings can be used. Grounding rings provide a greater surface area in comparison to a ground electrode and the corrosion is much less problematic. However, in some situations, ground rings are impractical. For example, the failure of a ground ring can result in leaking of the process fluid. Further, the use of an inert metal such as platinum is expensive. Accordingly, providing a magnetic flow meter with a ground electrode that can resist corrosion and is less expensive than ground rings would be particularly useful in some installations.

SUMMARY OF THE INVENTION

A magnetic flow meter includes circuitry that is adapted to be electrically coupled to a process fluid. A reference contact is configured to contact the process fluid flowing within a flowtube. An electrical component is provided in series between the reference contact and the circuitry to reduce the flow of electrical current through the reference contact.

DETAILED DESCRIPTION OF THE PREFERRED EMBODIMENTS

A magnetic flow meter is disclosed that provides increased ground electrode corrosion resistance in response to stray currents present in the process. In particular, embodiments of the present invention act to limit, or other inhibit, stray currents present in some process installations from flowing through the ground electrode to ground.

Figure 1:
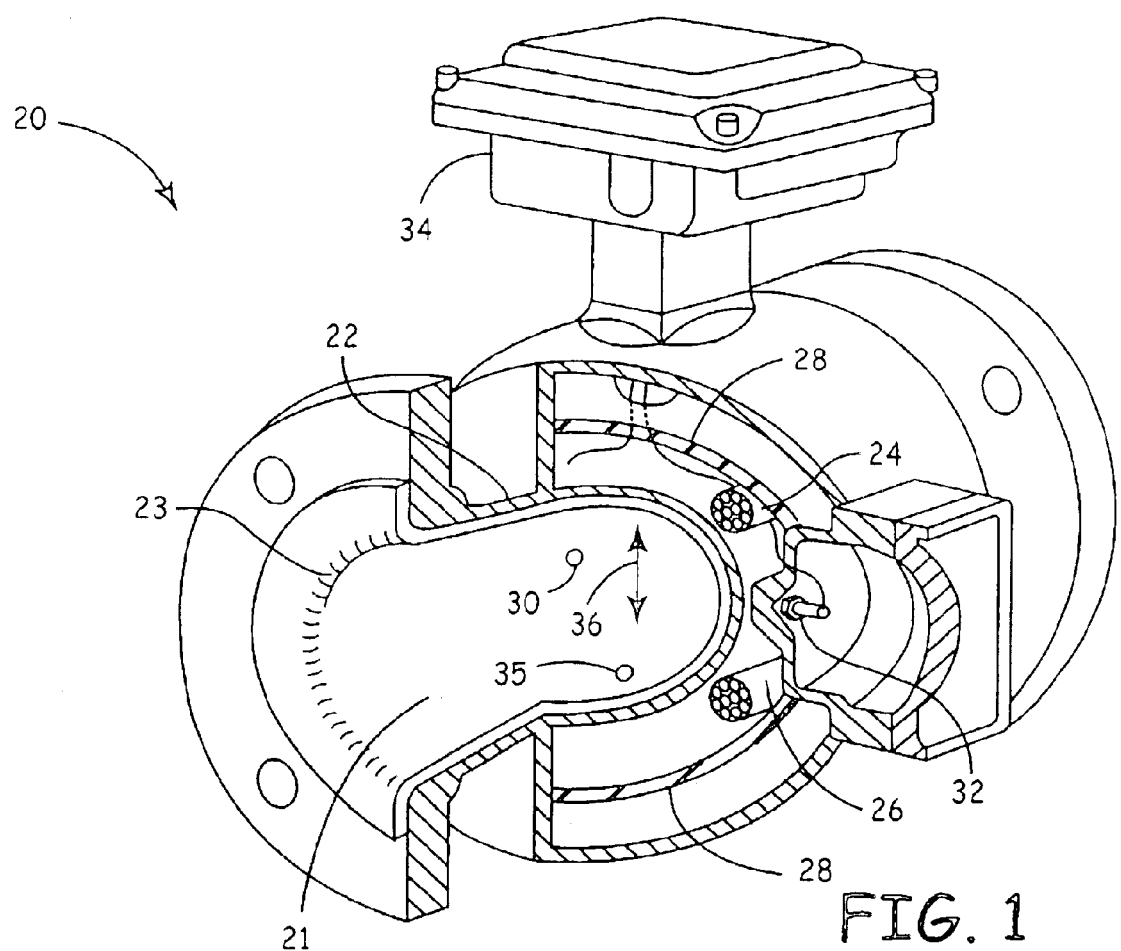
FIG. 1 is a partially cut away view of a magnetic flow meter in which embodiments of the present invention are particularly useful.

FIG. 1 is a partially cut away view of an embodiment of a magnetic flow meter in which embodiments of the present invention are particularly useful. Magnetic flow meter 20 includes a flowtube 22 formed of low magnetic permeability material with an electrically insulating liner 23, an electromagnet 26 is formed by a coil, a ferromagnetic core or shield 28 and electrodes 30, 32. The electromagnet 26 and the electrodes 30, 32 are wired to a transmitter circuit 34 as is ground electrode 35. In operation, the transmitter circuit 34 drives the electromagnet 26 with an electrical current, and the electromagnet 26 produces a magnetic field 36 indicated by arrows inside the flowtube 22. Process liquid 21 flows through the magnetic field in the flowtube 22, and the flow induces an electromotive force (EMF, voltage) in the liquid 21. The insulating liner 23 prevents leakage of the EMF from the liquid 21 to the metal flowtube 22. The electrodes 30, 32 contact the liquid 21 and pick up or sense the EMF which, according to Faraday's law, is proportional to the flow rate of the liquid 21 in the flowtube 22.

Figure 2:
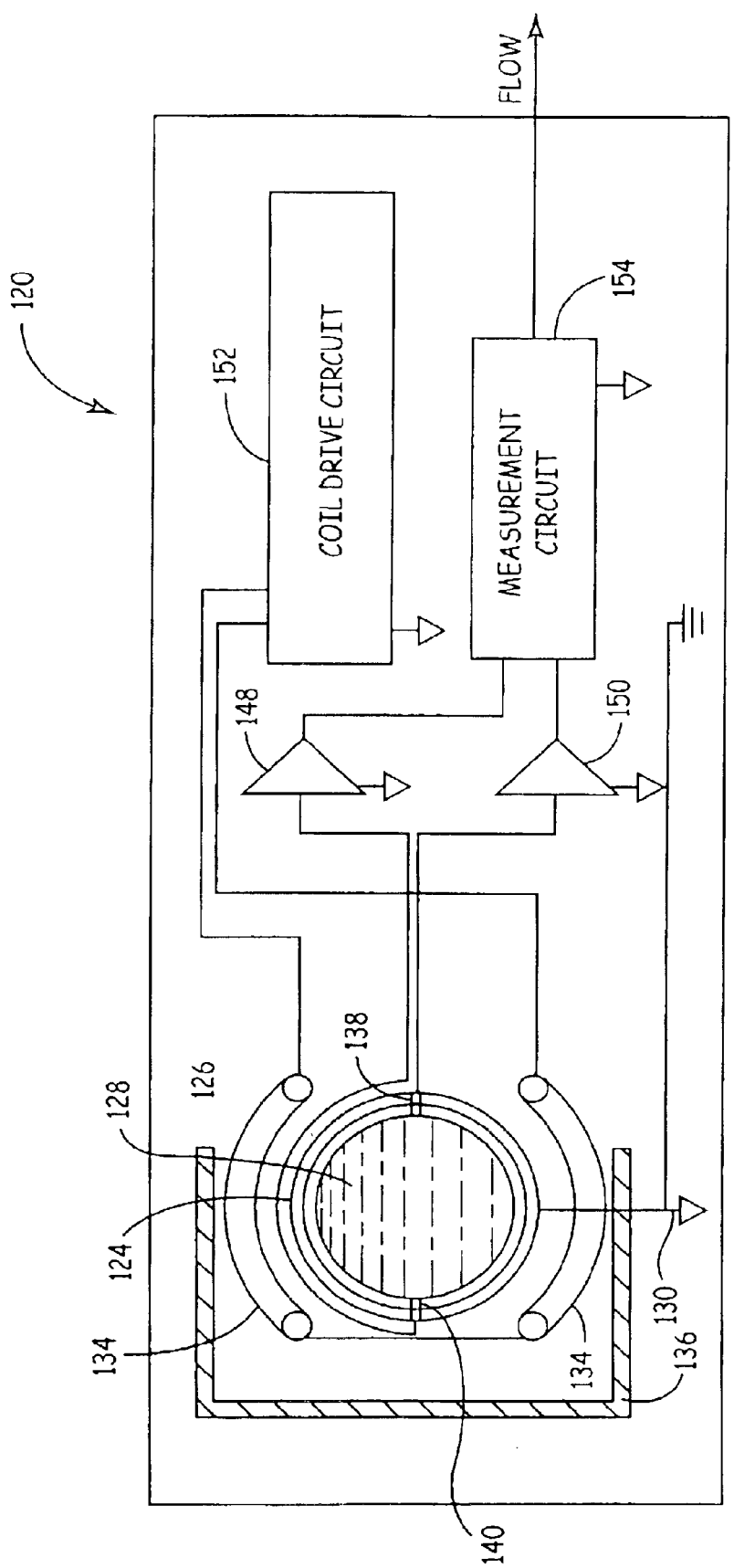
FIG. 2 is a diagrammatic view of a magnetic flow meter in which embodiments of the present invention are particularly useful.

FIG. 2 is a diagrammatic view of circuitry of a prior art magnetic flow meter. The magnetic flow meter 120 includes a flowtube 124 that has an insulated liner 126 adapted to carry a flowing liquid 128 that is electrically coupled to the flowtube 124 and is generally connected to earth ground 130. When the process piping is electrically coupled to the process fluid, an electrical connection between the piping and the flowtube provides the required electrical coupling of process fluid 128 to the flowtube. Coils 134 are positioned to apply a magnetic field to the process fluid in response to a drive signal from drive circuitry 152. Electrodes 138 and 140 couple to measurement circuitry 154 through amplifiers 150 and 148, respectively. Measurement circuitry 154 provides an output related to flow in accordance with known techniques.

As illustrated in FIG. 2, components within magnetic flow meter 120 are typically coupled to a common reference. For example, amplifiers 148 and 150 are referenced to a common reference which is connected to flowtube. This allows the transmitter to eliminate noise common to each electrode with reference to the process.

The configuration illustrated in FIG. 2 works particularly well where the process piping itself is metallic and thus can be connected directly to flowtube providing a strong electrical reference to the process fluid. There are however some situations where the process piping does not provide an electrical reference to the process. Specifically, some process installations use non-conductive piping or use conductive piping with non-conductive inner linings. In these cases, it is still important for the front end amplifier to be reference to the potential of the process fluid. This is because while the potential of the process fluid may vary significantly depending on stray currents, and/or interference, the potential measured across the electrodes 138, 140 is typically on the order of one or more millivolts. In these cases, a third grounding electrode is used with the magnetic flow meter. This grounding electrode is used to electrically contact the process fluid. However, in some installations, corrosion of the grounding electrode occurred unacceptably rapidly. The invention includes the recognition that excessive corrosion of the ground electrode can be caused by stray currents present in the process fluid which are shunted to ground through the electrode. For example, some processes require application of large potentials or electrical currents to the process fluid which may leak through the ground electrode.

Figure 3:
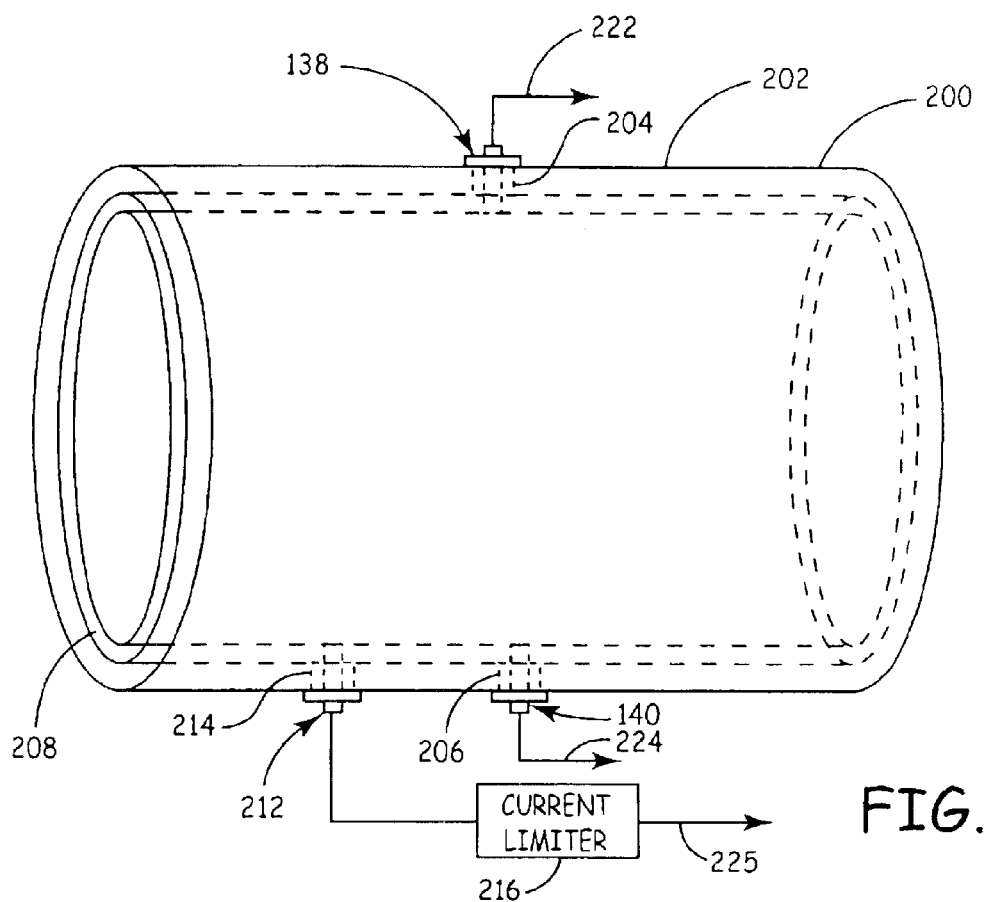
FIG. 3 is a diagrammatic view of a portion of the flowtube for use within a magnetic flow meter in accordance with an embodiment of the present invention.

FIG. 3 is a diagrammatic view of a portion of a flowtube for use within magnetic flow meter in accordance with an embodiment of the present invention. Portion 200 of flowtube includes a pair of electrodes 138, 140 extending through conductive casing 202 via non-conductive couplers 204, 206, respectively. Electrodes 138, 140 further extend through non-conductive lining 208 such that each of the electrodes 138, 140 electrically contact the fluid flowing within portion 200. Electrodes 138 and 140 couple to circuitry 198 (shown in FIG. 4) through connectors 222 and 224, respectively. In FIG. 3, ground electrode 212 passes through case 202 via a non-conductive coupler 214 which is preferably of a similar type of couplers 204 and 206. However, any manner of passing an electrically conductive electrode through conductive casing 202 in a non-conductive manner, or otherwise providing electrical access to the interior of case 202 while isolating electrode 212 therefrom can be used. Ground electrode 212 is coupled to circuitry 198 (shown in FIG. 4) through a current limiter 216 and connection 225. In one embodiment, current limiter 216 is simply a resistor. However, any device, or circuit which can function to limit or reduce the current component passing therethrough can be used to practice embodiments of the present invention. Preferably, current limiter 216 allows the potential of the process fluid to be coupled to measurement circuitry 198. Accordingly, current limiter 216 can include a filter or other electrical component or circuit. Additionally, while FIG. 3 illustrates simply one ground electrode 212, any number or configuration of such electrodes can be used in order to spread the corrosion over a plurality of such electrodes. In some embodiments, the ground electrode 212 can comprise a ground ring.

Figure 4:
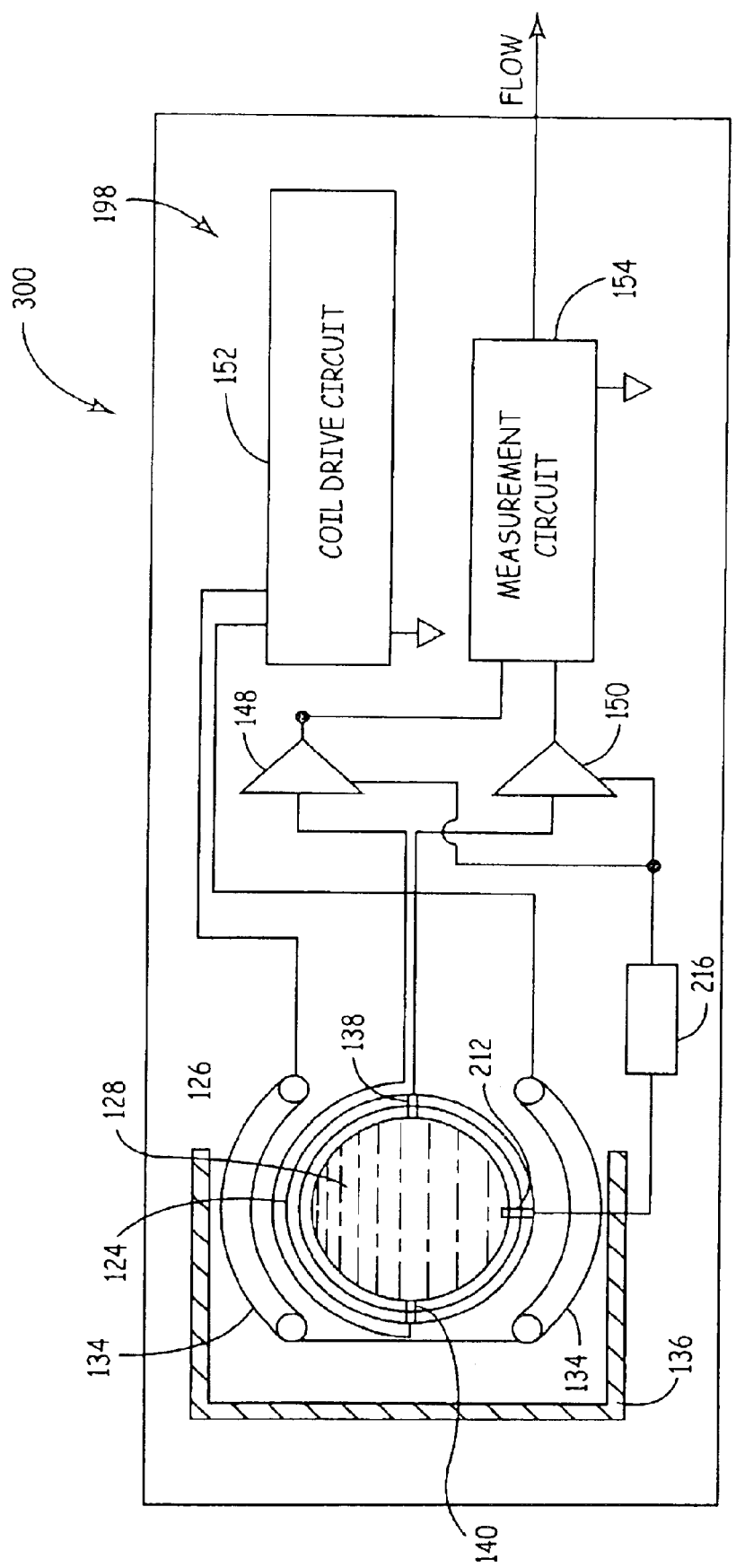
FIG. 4 is a diagrammatic view of a magnetic flow meter in accordance with an embodiment of the present invention.

FIG. 4 illustrates a magnetic flow meter 300 in accordance with an embodiment of the present invention. Components which are similar to components shown in FIG. 2 are numbered the same. The flowtube includes a ground electrode 212 that is operably coupled to amplifiers 148, 150 through current limiter 216. Accordingly, the output of amplifiers 148, 150 are referenced to the potential of the process fluid.

Although the present invention has been described with reference to preferred embodiments, workers skilled in the art will recognize that changes may be made in form and detail without departing from the spirit and scope of the invention. Typically, when a resistor is employed for the current limiter, its resistance will be between 10 ohm and 50 kohm, however, any appropriate value can be used, for example 100 kohm, 150 kohm or more. The ground electrode can be of any appropriate material such as platinum. The current limiter can be an integral component of the ground electrode, for example by adding impurities to the electrode or fabricating the limiter with the electrode.

What is claimed is:

1. A magnetic flow meter comprising:
   measurement circuitry;
   a flowtube;
   at least first and second electrodes disposed within the flowtube and coupled to the measurement circuitry;
   at least a reference electrode operably coupled to the measurement circuitry and disposed to electrically couple to process fluid within the flowtube; and
   a current limiter coupled to the reference electrode and adapted to couple to the measurement circuitry, the current limiter configured to reduce corrosion of the reference electrode.

2. The flow meter of claim 1, wherein the reference electrode comprises platinum.

3. The flow meter of claim 1, and further comprising another reference electrode operably coupled to the measurement circuitry and disposed to contact process fluid.

4. The flow meter of claim 1, wherein the current limiter comprises a resistor.

5. The flow meter of claim 4 wherein the resistor has a resistance of between about 10 ohm and about 150 kohm.

6. The flow meter of claim 1, and further comprising a conductive flow meter case containing the transmitter circuitry and being coupled to the flowtube, wherein the current limiter is coupled to the case and the case is adapted to coupled to ground.

7. The flow meter of claim 1, wherein the reference electrode is coupled to the flowtube via a non-conductive coupler to electrically isolate the reference electrode from the tube.

8. The flow meter of claim 1 wherein the measurement circuitry includes an amplifier coupled to the first electrode and wherein the amplifier is referenced to a potential of the process fluid through the reference electrode and current limiter.

9. The flowmeter of claim 1 wherein the reference electrode comprises a ground ring.

10. A flowtube for a magnetic flow meter, the flowtube comprising:

a conductive tube having a non-conductive inner surface;

first and second electrodes disposed on an inner surface and being adapted to contact process fluid;

a reference electrode mounted to the conductive tube, and electrically isolated therefrom, the reference electrode being disposed to electrically couple to process fluid; and a current limiter configured electrically coupled to the reference electrode and being adapted to couple in series to a measurement circuitry.

11. The flowtube of claim 10 wherein the current limiter is a resistor.

12. The flow meter of claim 10 wherein the resistor has a resistance of between about 10 ohm and about 150 kohm.

13. The flowtube of claim 10 wherein the reference electrode comprises platinum.

14. The flowtube of claim 10 wherein the reference electrode is mounted to the flowtube via a non-conductive coupler.

15. The flowtube of claim 10 wherein the reference electrode comprises a ground ring.

16. A method of reducing corrosion of a reference electrode configured to sense a potential of process fluid in a magnetic flow meter, comprising:

disposing at least first and second electrodes within a flowtube and coupled to flow measurement circuitry;

obtaining a current limiter; and placing the current limiter electrically in series with the reference electrode and flow measurement circuitry, the current limiter configured to reduce corrosion of the reference electrode.

17. The method of claim 16 wherein the current limiter comprises a resistor.

18. The method of claim 16 wherein the resistor has a resistance of between about 10 ohm and about 150 kohm.

19. The method of claim 16 wherein the reference comprises a ground ring.

* * * * *